United States Patent
Hembry et al.

(10) Patent No.: US 7,058,651 B2
(45) Date of Patent: *Jun. 6, 2006

(54) METHOD, COMPUTER PROGRAM PRODUCT, AND SYSTEM FOR AUTOMATIC CLASS GENERATION WITH SIMULTANEOUS CUSTOMIZATION AND INTERCHANGE CAPABILITY

(75) Inventors: Douglas Michael Frederick Hembry, Los Gatos, CA (US); Christopher M. Holtz, San Jose, CA (US); Robert Daniel Love, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 562 days.

This patent is subject to a terminal disclaimer.

(21) Appl. No.: 10/173,521

(22) Filed: Jun. 14, 2002

(65) Prior Publication Data
US 2003/0233373 A1    Dec. 18, 2003

(51) Int. Cl.
*G06F 17/30*    (2006.01)
(52) U.S. Cl. .................. 707/102; 707/103 Y; 707/10
(58) Field of Classification Search ................ 707/1–3, 707/10, 100, 102–103, 200, 201, 103 R, 707/103 X, 103 Y, 103 Z; 717/100, 118
See application file for complete search history.

(56) References Cited

U.S. PATENT DOCUMENTS

| | | | | |
|---|---|---|---|---|
| 4,873,625 A | | 10/1989 | Archer et al. ................... 707/7 |
| 5,737,597 A | | 4/1998 | Blackman et al. ........... 395/613 |
| 5,754,858 A | * | 5/1998 | Broman et al. .............. 717/111 |
| 5,799,313 A | * | 8/1998 | Blackman et al. ...... 707/103 R |
| 5,924,101 A | * | 7/1999 | Bach et al. ............. 707/103 R |
| 6,026,408 A | | 2/2000 | Srinivasan et al. ......... 707/103 |
| 6,044,217 A | | 3/2000 | Brealey et al. ............. 395/701 |
| 6,049,665 A | * | 4/2000 | Branson et al. ............. 717/108 |
| 6,085,188 A | * | 7/2000 | Bachmann et al. ............ 707/3 |
| 6,085,198 A | | 7/2000 | Skinner et al. ............. 707/103 |
| 6,128,611 A | * | 10/2000 | Doan et al. ..................... 707/4 |
| 6,202,069 B1 | * | 3/2001 | Blackman et al. ...... 707/103 R |
| 6,236,994 B1 | | 5/2001 | Swartz et al. .................. 707/6 |
| 6,341,288 B1 | * | 1/2002 | Yach et al. ............. 707/103 R |
| 6,345,256 B1 | | 2/2002 | Milsted et al. .................. 705/1 |
| 6,529,914 B1 | * | 3/2003 | Doan et al. ............. 707/103 Y |
| 6,539,397 B1 | | 3/2003 | Doan et al. ............. 707/103 R |
| 6,665,677 B1 | | 12/2003 | Wotring et al. ............. 707/100 |

(Continued)

FOREIGN PATENT DOCUMENTS

EP        1122653 A2    10/1993

OTHER PUBLICATIONS

Kearney, J., "Executing IMS transactions from OS/390 Java applications though the Java-OTMA package" Developer Toolbox Technical Magazine, Jan. 2001. http://www6.software.ibm.com/devcon/devcon.docs/new0101c.html.

(Continued)

*Primary Examiner*—Greta Robinson
(74) *Attorney, Agent, or Firm*—Kunzler & Associates

(57) ABSTRACT

A database definition, logical database view, extended field definition and control statement information are accessed to build an in-memory representation of selective information contained therein. Utilizing this in-memory representation, a class in one form is automatically generated and customized wherein this class is used to access a hierarchical database responsive to a hierarchical database access request from an application.

24 Claims, 10 Drawing Sheets

U.S. PATENT DOCUMENTS

| | | |
|---|---|---|
| 6,754,671 B1 * | 6/2004 | Hrebejk et al. .......... 707/103 R |
| 6,845,376 B1 * | 1/2005 | Johnson ....................... 707/100 |
| 6,874,146 B1 * | 3/2005 | Iyengar ....................... 719/313 |
| 2001/0016843 A1 | 8/2001 | Olson et al. ...................... 707/3 |
| 2002/0029375 A1 | 3/2002 | Mlynarczyk et al. ....... 717/108 |
| 2002/0038335 A1 | 3/2002 | Dong et al. .................. 709/203 |
| 2002/0038450 A1 | 3/2002 | Kloppmann et al. ........ 717/102 |

OTHER PUBLICATIONS

Yu, C., "Using Informix JDBC Driver in VisualAge for Java", http://www7b.boulder.ibm.com/wsdd/library/techarticles/0201_yu/yu.html.

Beauvoir, P., "Implementing IMS Metadata 1.1 Specifications as a Preliminary to Implementing Content Packaging 1.0 Specifications in Colloquia", http://toomol.bangor.ac.uk/co3/documents/metadataimplemntation.html.

"JDBC—Java Access to SQL Databases", http://mindprod.com/jdbc.html.

"IMS Java User's Guide", Internatinoal Business Machines Corp., 2nd. Edition, SC27-0832-01, Jun. 2001.

M. Mehdi Owrang O., "A universal hierarchical language interface for IMS", *Proceedings of Focus on Software*, Atlanta, GA, Feb. 1988, p. 644-51.

Hill, J. E. et al., "Communication and Interaction Objects for Connecting a Application to a Database Management System", IBM Santa Teresa Lab, Infogate article 13 of 484, Dec. 2000, (Abstract only).

"Technology of Host-based Application Systems in a CORBA-based C-environment", *Proceedings of OOP '97*. Muchen, Germany, Feb. 3-7, 1997, pp. 101-109.

Atkinson et al. Types and Persistence in Database Programming Languages. *ACM Computing Surveys*, vol. 19, No. 2, Jun. 1987, pp. 105-190.

Dave Mendien. Database Diagramming with Visual Studio 6.0 and SQL Server 7.0 *Visual Studi*, Nov. 1998.

Navathe, S.B. Schema Analysis for Database Restructuring. *ACM Transactions on Database Systems*, vol. 5, No. 2 (Jun. 1980), pp. 157-184.

* cited by examiner

```
DBD  NAME=DEALERDB,ACCESS=(HDAM,OSAM),RMNAME=(DFSHDC40.1.10)
SEGM NAME=DEALER,PARENT=0,BYTES=94
FIELD NAME=(DLRNO,SEQ,U),BYTES=4,START=1,TYPE=C
FIELD NAME=DLRNAME,BYTES=30,START=5,TYPE=C
SEGM NAME=MODEL,PARENT=DEALER,BYTES=43
FIELD NAME=(MODTYPE,SEQ,U),BYTES=2,START=1,TYPE=C
FIELD NAME=MAKE,BYTES=10,START=3,TYPE=C
SEGM NAME=ORDER,PARENT=MODEL,BYTES=127
FIELD NAME=(ORDNBR,SEQ,U),BYTES=6,START=1,TYPE=C
FIELD NAME=LASTNME,BYTES=25,START=50,TYPE=C
SEGM NAME=SALES,PARENT=MODEL,BYTES=113
FIELD NAME=(SALDATE,SEQ,U),BYTES=8,START=1,TYPE=C
FIELD NAME=LASTNME,BYTES=25,START=9,TYPE=C
FIELD NAME=FIRSTNME,BYTES=25,START=34,TYPE=C
SEGM NAME=STOCK,PARENT=MODEL,BYTES=62
FIELD NAME=(STKVIN,SEQ,U),BYTES=20,START=1,TYPE=C
FIELD NAME=PRICE,BYTES=5,START=47,TYPE=C
DBDGEN
FINISH
END
```

```
DLR_PCB1 PCB  TYPE=DB,DBDNAME=DEALERDB,PROCOPT=GO,KEYLEN=42
         SENSEG  NAME=DEALER, PARENT=0
         SENSEG  NAME=MODEL, PARENT=DEALER
         SENSEG  NAME=ORDER, PARENT=MODEL
         SENSEG  NAME=SALES, PARENT=MODEL
         SENSEG  NAME=STOCK, PARENT=MODEL
         PSBGEN  PSBNAME=DLR_PSB,MAXQ=200
         END
```

Figure 5

```
OPTIONS
    PSBds=proto.type.input DBDds=proto.type.input
    GenJavaSource=YES
    gentrace=yes
    genXMI=yes
    outpath=gen
        Package=com.ibm.ims.tooling PSB psbName=DLR_PSB JavaName=DealerDatabaseView
PCB PCBName=DLR_PCB1 JavaName=DealershipDB
Include Dataset=protoIncludes/cntrstmt2
```

Figure 6

```
SEGM DBDName=DEALERDB SegmentName=DEALER JavaName=DealerSeg
FIELD Start=1 Bytes=4 Name=DLRNO JavaName=DealerNumber JavaType=CHAR
FIELD JavaName=DealerName Bytes=30 Start=5 JavaType=CHAR
FIELD JavaName=YTDSales JavaType=PACKEDDECIMAL TypeQualifier=S9(18)
      Start=85 Bytes=10

SEGM DBDName=DEALERDB SegmentName=MODEL JavaName=ModelSeg
FIELD Start=1 Bytes=2 Name=MODTYPE JavaName=ModelTypeCode JavaType=CHAR
FIELD Start=3 Bytes=10 Name=MAKE JavaName=CarMake JavaType=CHAR
FIELD JavaName=EPAHighwayMilage JavaType=CHAR Start=36 Bytes=4
FIELD JavaName=Horsepower JavaType=CHAR Start=40 Bytes=4

SEGM DBDName=DEALERDB SegmentName=ORDER JavaName=OrderSeg
FIELD Start=1 Bytes=6 Name=ORDNBR JavaName=OrderNumber
      JavaType=CHAR
FIELD JavaName=Price JavaType=ZONEDDECIMAL TypeQualifier=99999
      Start=37 Bytes=5
FIELD JavaName=OrderDate JavaType=CHAR Start=42 Bytes=8
FIELD Start=50 Bytes=25 Name=LASTNME JavaName=PurchaserLastName
      JavaType=CHAR
FIELD JavaName=DeliverDate JavaType=CHAR Start=120 Bytes=8
SEGM DBDName=DEALERDB SegmentName=SALES JavaName=SalesSeg
FIELD Start=1 Bytes=8 Name=SALDATE JavaName=DateSold
      JavaType=CHAR
FIELD Start=9 Bytes=25 Name=LASTNME JavaName=PurchaserLastName
      JavaType=CHAR
FIELD Start=34 Bytes=25 Name=FIRSTNME JavaName=PurchasetFirstName
      JavaType=CHAR
FIELD JavaName=SoldBy JavaType=CHAR Start=84 Bytes=10
```

Figure 7

METHOD, COMPUTER PROGRAM PRODUCT, AND SYSTEM FOR AUTOMATIC CLASS GENERATION WITH SIMULTANEOUS CUSTOMIZATION AND INTERCHANGE CAPABILITY

FIELD OF INVENTION

The present invention relates generally to accessing databases, and in particular, to accessing hierarchical databases from object oriented applications. The Java language incorporating industry standard JDBC (Java Database Connectivity) and SQL (Structured Query Language is one example of an object oriented application. (Java is a trademark of Sun Microsystems, Inc. in the United States and/or other countries.)

BACKGROUND

Hierarchical databases, such as IBM's IMS (Information Management System), are well known in the art. (IMS is a trademark of International Business Machines Corporation in the United States, other countries, or both.) IMS is a hierarchical database management system (HDBMS) with wide spread usage in many large enterprises where high transaction volume, reliability, availability and scalability are of the utmost importance. IMS provides software and interfaces for running the businesses of many of the world's largest corporations. However, companies incorporating IMS databases into their business models typically make significant investments in IMS application programs in order to have IMS perform meaningful data processing particularly tailored to the needs of their respective enterprises. IMS application programs are typically coded in COBOL, PL/I, C, PASCAL, Assembly Language, or Java.

The near universal acceptance of web technologies has significantly expanded the pool of programmers with extensive skills in object oriented languages, such as the Java programming language. With escalating demands for new applications, and particularly web-based applications, it is desirable to tap into this talent pool to help meet this demand. However, there are several problems (discussed infra) which interfere with efficient application development when Java is used as the application development language. Today an enterprise may be faced with the undesirable choice of deferring new applications due to a skills shortage or utilizing the available Java programmer resource and accepting extended development cycles because of the inherent inefficiencies when this development platform is utilized for applications accessing hierarchical databases.

Those of ordinary skill in the art will recognize that Java is an object oriented programming language that requires the creation of object oriented constructs such as classes. Therefore, when accessing hierarchical data from a Java application incorporating JDBC and SQL (hereinafter such applications are referred to as simply Java applications), all of the existing information reflecting existing databases must be transformed from procedural language data structures to object oriented classes. These procedural language data structures comprise database definitions, database views and field definitions.

Furthermore, when transforming these procedural language data structures to classes, the application developer frequently needs to add additional information to the object oriented classes to take advantage of various features within the Java development environment not available within the legacy programming environment. For example, within the Java environment, names of segments, fields, etc. are not restricted to 8 bytes of length but rather can be expanded to any length to have a meaningful name that conveniently conveys additional information about the named entity. Utilizing this feature of the Java programming language to access hierarchical data can improve programmer efficiency as well as minimize programming errors that occur when restricted length arcane symbols are miscomprehended.

Currently, when developing Java applications to access hierarchical databases, the Java programmer is required to manually subclass a base class (known as DLIDatabaseView) to create the required classes (known as metadata classes, since the class data represents "data about data") to reflect the application's view of the hierarchical database. This is an extremely tedious and error prone process that involves manually reading complex IMS constructs (such as PSBs, PCBs, DBDs and Cobol Copylibs) and trying to decipher the relevant information from the syntax embedded within the constructs. In addition, transforming these legacy constructs into the appropriate metadata classes may require the programmer to manually add additional information to take advantage of various desirable features of the Java environment (as briefly discussed supra).

Once classes, encapsulating required hierarchical database information, are complete, there remains an additional problem of how to use this information within other tools and programming environments. Typically, another object oriented programming tool needing this same information would once again require manual conversion of these legacy hierarchical database data structures into a new object oriented form encapsulating the same hierarchical database information. This "manual data interchange" process is time consuming and has the same risks of introducing additional errors as discussed supra for the conversion process.

Accordingly, there is a great need for an automated and integrative approach to building, customizing and interchanging the class information required to access legacy hierarchical databases from an object oriented application whereby the deployment of object oriented applications and other object oriented tools required to access hierarchical databases may be accomplished in a more efficient and reliable manner.

SUMMARY OF THE INVENTION

To overcome these limitations in the prior art briefly described above, the present invention provides a method, program product and apparatus for automatically generating and customizing a class to facilitate access to a hierarchical database from an application program. A database definition, logical database view, extended field definition and control statement information are accessed to build an in-memory representation of selective information contained therein. Utilizing this in-memory representation, a class in one form is automatically generated and customized wherein this class is used to access the hierarchical database responsive to a hierarchical database access request from an application. The utility program performing the above computer implemented steps may be referred to as a "class integrator utility program".

The above method for automatically generating and customizing a class further comprises automatic interchange and the method steps further comprise utilizing the in-memory representation to generate an eXtensible Markup Language Interchange (XMI) stream of metadata defining the class. In this way the XMI stream may be used to regenerate the class in the same or another form for use with another application requiring access to the hierarchical database.

In another embodiment of the present invention, the above-described class integrator utility program may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for accessing a hierarchical database from a JAVA application program is also disclosed. (JAVA is a trademark of Sun Corp. and references to Java or JAVA as used herein refer to the programming language known also as JAVA or java) A class integrator utility program is invoked to automatically generate and customize one or more classes wherein these classes encapsulate information from at least one database definition, at least one database view, at least one extended field definition and at least one control statement. An API is invoked by the Java application to access the hierarchical database wherein, responsive to said API invocation, the one or more classes are utilized to access the hierarchical database.

In this manner, an object oriented application may utilize automatically generated classes to access hierarchical databases corresponding to the generated classes. In this way, the cumbersome, time-consuming and error prone manual process of reading legacy data structures and coding classes by hand can be eliminated. Utilizing a single invocation of a class integrator utility program, the required classes can be automatically generated and customized in accordance with existing legacy data structures and a programmer's desire to utilize additional features available within the object oriented language development environment.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 4 shows an exemplary database definition for the hierarchical database;

FIG. 5 shows an exemplary logical database view of the hierarchical database;

FIG. 6 shows exemplary control statement syntax;

FIG. 7 shows additional exemplary control statement syntax;

DETAILED DESCRIPTION

The present invention overcomes the problems associated with the prior art by teaching a system, computer program product, and method for the automatic generation of classes with an integrated customization and interchange capability. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described and claimed herein. The following description is presented to enable one of ordinary skill in the art to make and use the present invention and is provided in the context of a patent application and its requirements.

Figure 1:
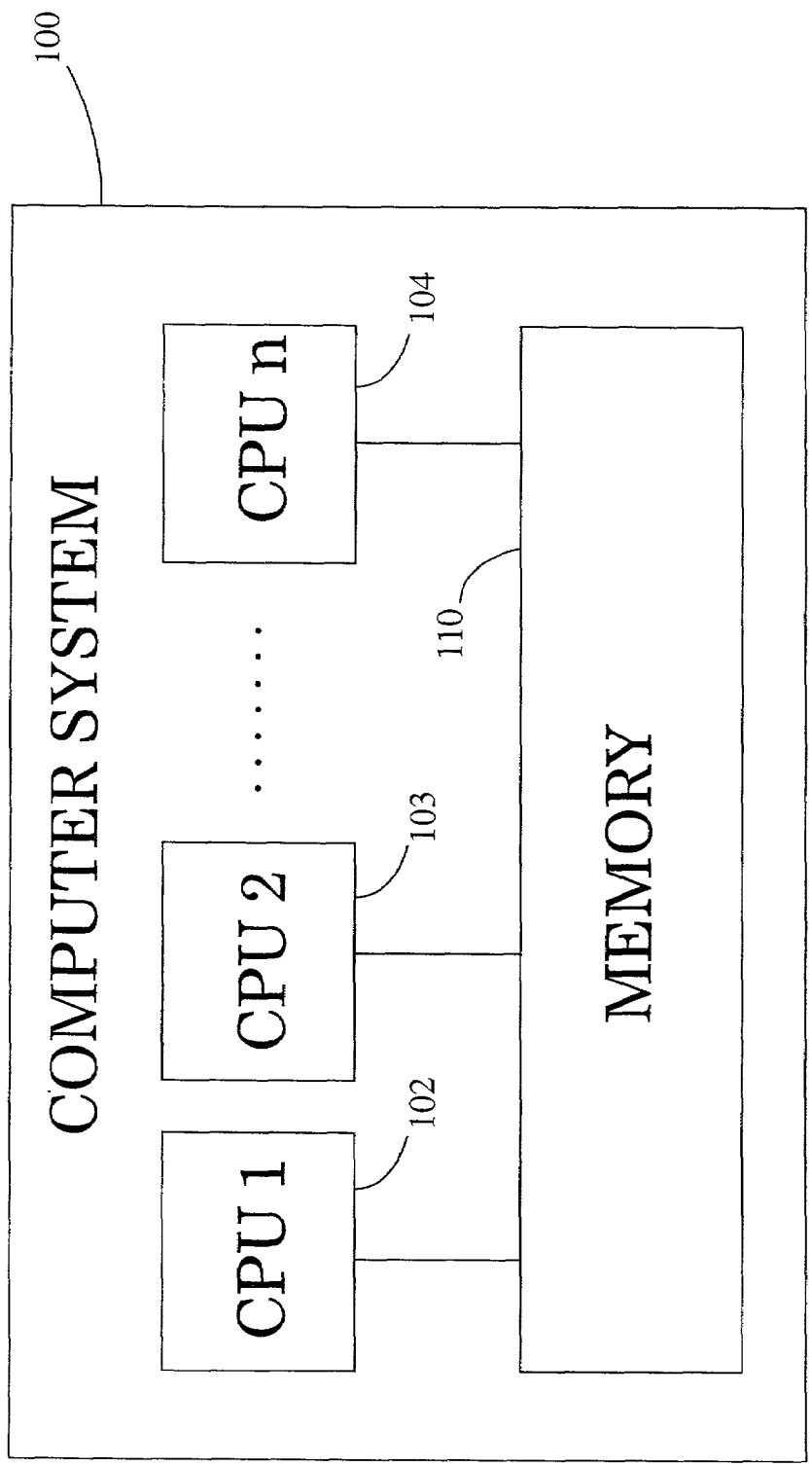
FIG. 1 is a block diagram of a typical computer system wherein the present invention may be practiced.

FIG. 1 is a block diagram of a computer system 100, such as the S/390 mainframe computer system, in which teachings of the present invention may be embodied. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, numerous other components may be utilized with computer system 100, such as input/output devices comprising keyboards, displays, direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Those of ordinary skill in the art will further appreciate that a wide range of computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

IMS-Java was introduced with IMS V7 R1. The IMS Java Users Guide, SC27-0832, documents a required manual procedure for defining a Java "metadata" class for each application that describes the logical database view of the application's PSB (Program Specification Block). The name of this class is passed to IMS-Java by the application program when the JDBC (Java Database Connectivity) connection to the database is established. IMS-Java uses the class to map the JDBC commands issued by the application to IMS database calls, and to map the segments and fields returned by IMS to the result set returned by IMS Java to the application program.

The manual procedure to define this metadata class is not trivial. The outer class is derived from a provided superclass, DLIDatabaseView. The user must instantiate variables from other provided classes, DLISegmentInfo, DLISegment, DLITypeInfo, and DLISecondaryIndexInfo to describe the segment hierarchy and the fields that make up the PSB's logical view. If the PSB contains multiple database PCBs (Program Control Blocks), then multiple hierarchies, one for each PCB, must be described within the outer class. Moreover, the segment layouts must correctly allow for the presence of concatenated segments, field-level sensitivity, and XDFLD "fields" of secondary indexes.

Finally, the segment layout information from the FIELD macros in DBDs (Database Definitions) may be incomplete, and the user may need to merge information from other sources about additional fields, their lengths, positions in the segment, and data types. This information is typically extracted (again, manually) from fragments of existing high-level language applications, such as COBOL copybooks, and is referred to herein as "extended field definitions".

Overall, this manual procedure impacts the usability of the IMS Java facility and the availability of IMS-Java applications, since the manual creation is error-prone and certain errors may only show up at run time. Maintainability is also impacted, since changes to the logical database views may require manual rework of the class definition and requiring use of complex IMS-Java documentation. The manual class creation procedure seriously reduces the potential productivity benefits of Java for IMS application development. The invention disclosed herein addresses these and other problems.

Furthermore, applications and other products may need the ability to interpret the structure of the same set of IMS databases for their own purposes. For such products, the present invention integrates the creation of an XMI stream along with the automatic class generation of IMS databases. As an example, consider the DB2 Stored Procedure Builder, which, if given the capability to access IMS databases through the IMS-Java JDBC interface, would need to be given information about the set of databases it was to process. It would not be very efficient to analyze native IMS PSBs or DBDs. Rather, the needed information should be provided in a more standard, easy-to-process form.

Figure 2:
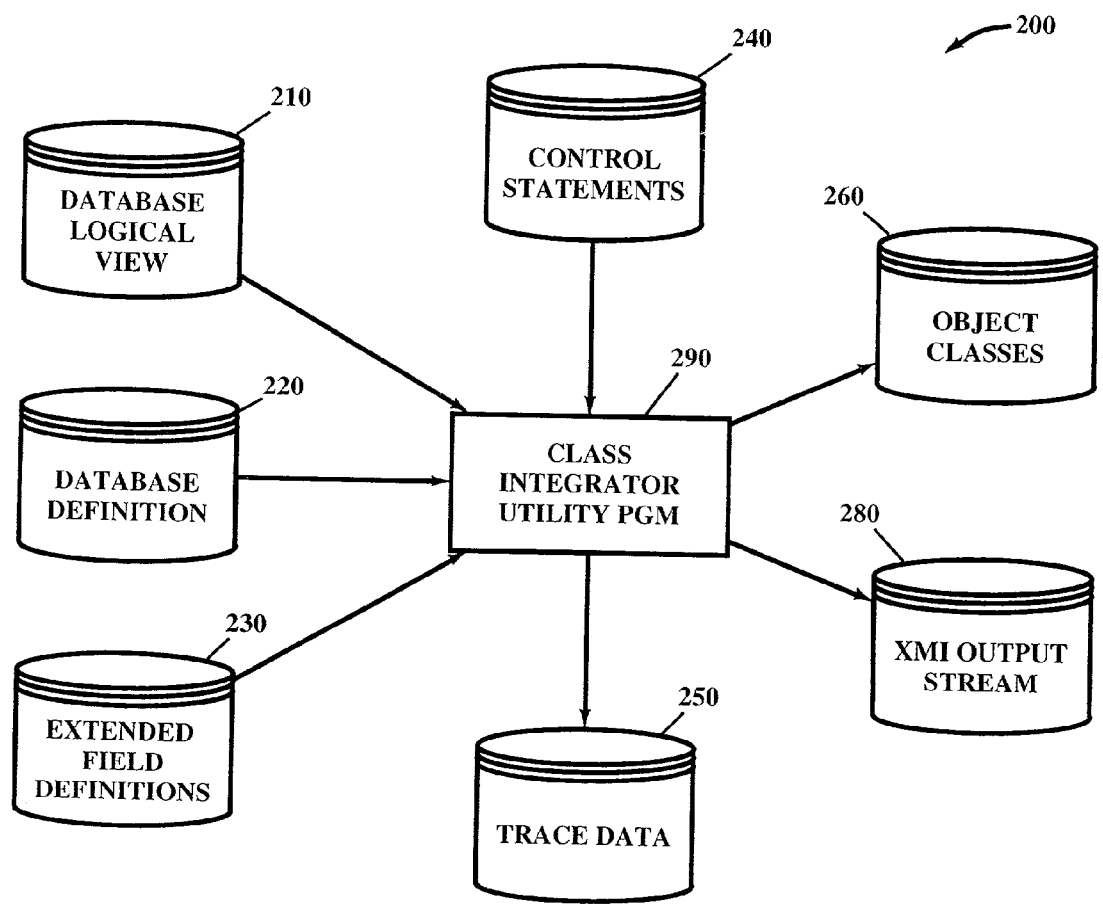
FIG. 2 shows a block diagram summarizing the inputs and outputs of a class integrator utility program in accordance with the present invention.

Referring now to FIG. 2, block diagram 200 illustrates the inputs and outputs of a class generation utility program. A class generation utility program, with integrated customization and interchange capabilities, is referred to herein as a "class integrator utility program" 290. Database definition 220 represents a physical description of a hierarchical data base, such as a DBD (Database Definition) in the case of an IMS database. This information typically comprises descriptions of the hierarchical segments, their hierarchical relationships, and searchable fields within the segments.

Database logical view 210 represents a logical view of one or more hierarchical databases, as required for a particular application using the database. This information typically comprises segments within the physical database that the application is authorized to process and the hierarchical relationship of those segments. In the case of IMS this information is contained within the PSB, which is in turn comprised of one or more PCBs encompassing one or more logical views spanning single or multiple physical IMS databases.

Since the database definition typically contains field information for just the searchable fields, extended field definitions 230 are also input to class integrator utility program 290. These extended field definitions provide additional segment mapping detail and are typically contained with high-level language constructs, such as COBOL copybooks.

Control statements 240 are also input to class integrator utility program 290. These control statements direct the processing flow according to the desired features and functions to be performed. Additionally, these control statements may be used to customize the generated classes to take advantage of features within a Java or object oriented programming environment not present within the legacy environment. For example, Java alias names may be established for any segment or field; and the name can be any length, as required, to enable the name to convey information about the named entity. Reasonable naming conventions improve programmer efficiency and reduce programmer errors. Additionally, the generated classes can be customized with new field names to accommodate new features or application extensions.

Class integrator utility program 290, utilizing selected information from inputs 210, 220 230 and 240 outputs the generated and customized classes 260 encapsulating hierarchical database metadata for use with object oriented applications, such as Java, required to access the associated hierarchical database. Additionally, if requested by a user, class integrator utility program 290 further outputs an XMI stream 280 representative of all metadata encapsulated within classes 260. The XMI 280 stream may be utilized by other applications and tools to regenerate this class information into a required form appropriate for their particular usage.

Class integrator utility program 290 optionally outputs trace data 250. This information may be utilized for status and debugging purposes, as well as for facilitating additional application development.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
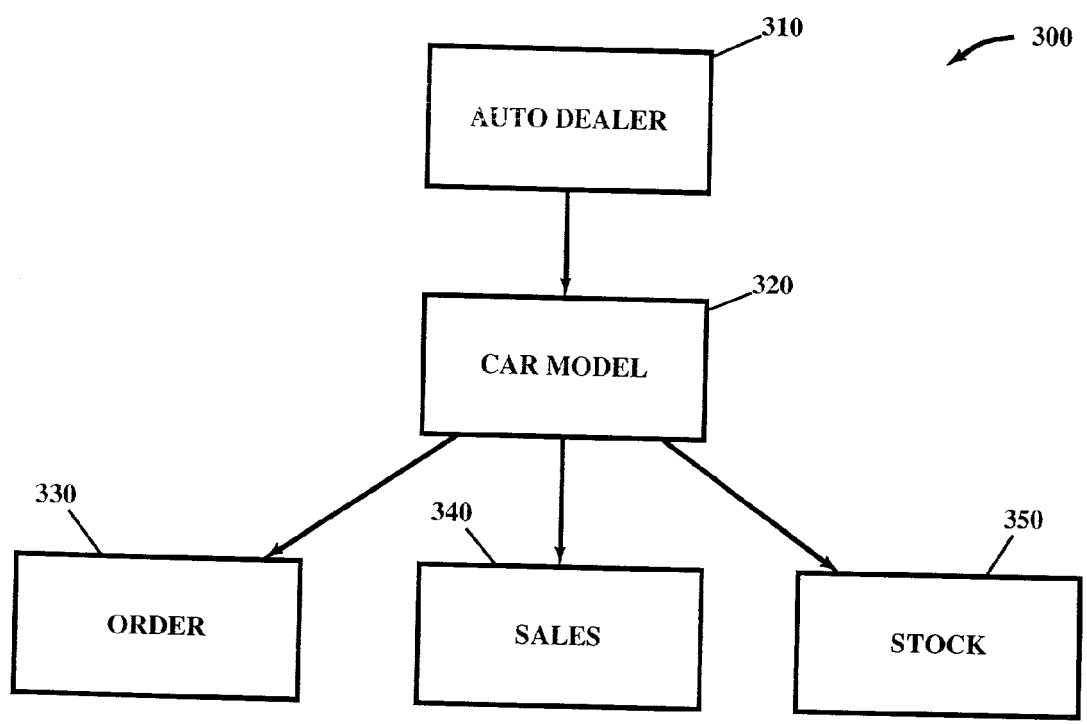
FIG. 3 shows a high level model of an exemplary hierarchical database.

Referring now to FIG. 3, a model 300 of an exemplary hierarchical database is shown. This exemplary hierarchical database will serve as the basis for various other samples of IMS metadata provided as an aid to understanding the concepts taught herein. Dealer segment 310 identifies an automobile dealership selling cars. This segment may contain fields, such as the name of the dealership, and the dealership address.

Dealers carry car types, each of which has a corresponding Model segment 320. A model segment may contain fields such as the car model (such as Nissan Maxima), and a model description. Other segments include Order 330, Sales 340 and Stock 350 representing information pertaining to orders, sales and inventory for each car model, with additional fields defined appropriate to their usage within an application.

Referring now to FIG. 4 an exemplary hierarchical database definition 400 is shown, in accordance with model 300 discussed supra. In FIG. 5 an exemplary database logical view 500 is shown representing the logical view of an exemplary application requiring access to the hierarchical database defined by database definition 400. FIG. 6 shows a set of control statements specifying processing options and identifying a logical database view. In addition, an "Include" control statement identifies a second file of additional control statements shown in FIG. 7. The control statements 700 of FIG. 7 further customize database logical view 500 with additional segment and field information. Taken together FIGS. 4–7, along with any extended field definitions (not shown), represent the source data from which class integrator utility program 290 acquires needed information to generate, customize and interchange Java classes.

Appendix A contains the Java class that is automatically generated and customized by Class Integrator Utility Program 290 when presented with the data sources depicted in FIGS. 4–7. Appendix B contains the XMI data stream of metadata generated by Class Integrator Utility Program 290 to facilitate automatic interchange of metadata encapsulated in the Java class illustrated in Appendix A. Those of ordinary skill in the art will recognize that the teachings contained herein may apply to other object oriented languages and accordingly the generated classes may be classes for any object oriented language in addition to the Java language.

Figure 8:
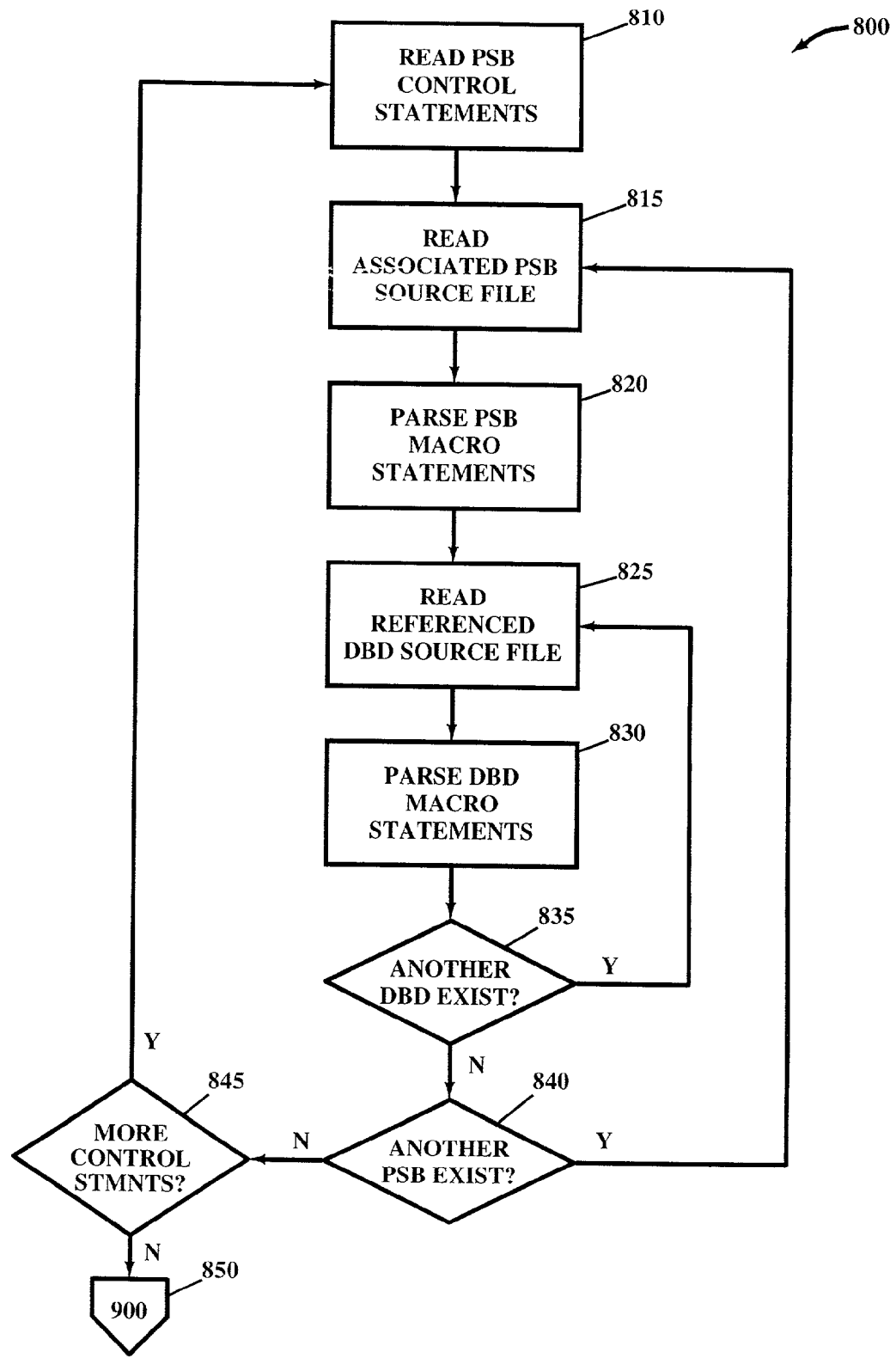
FIG. 8 is a flow diagram summarizing phase 1 processing of the class integrator utility program in accordance with one embodiment of the present invention.
Figure 9:
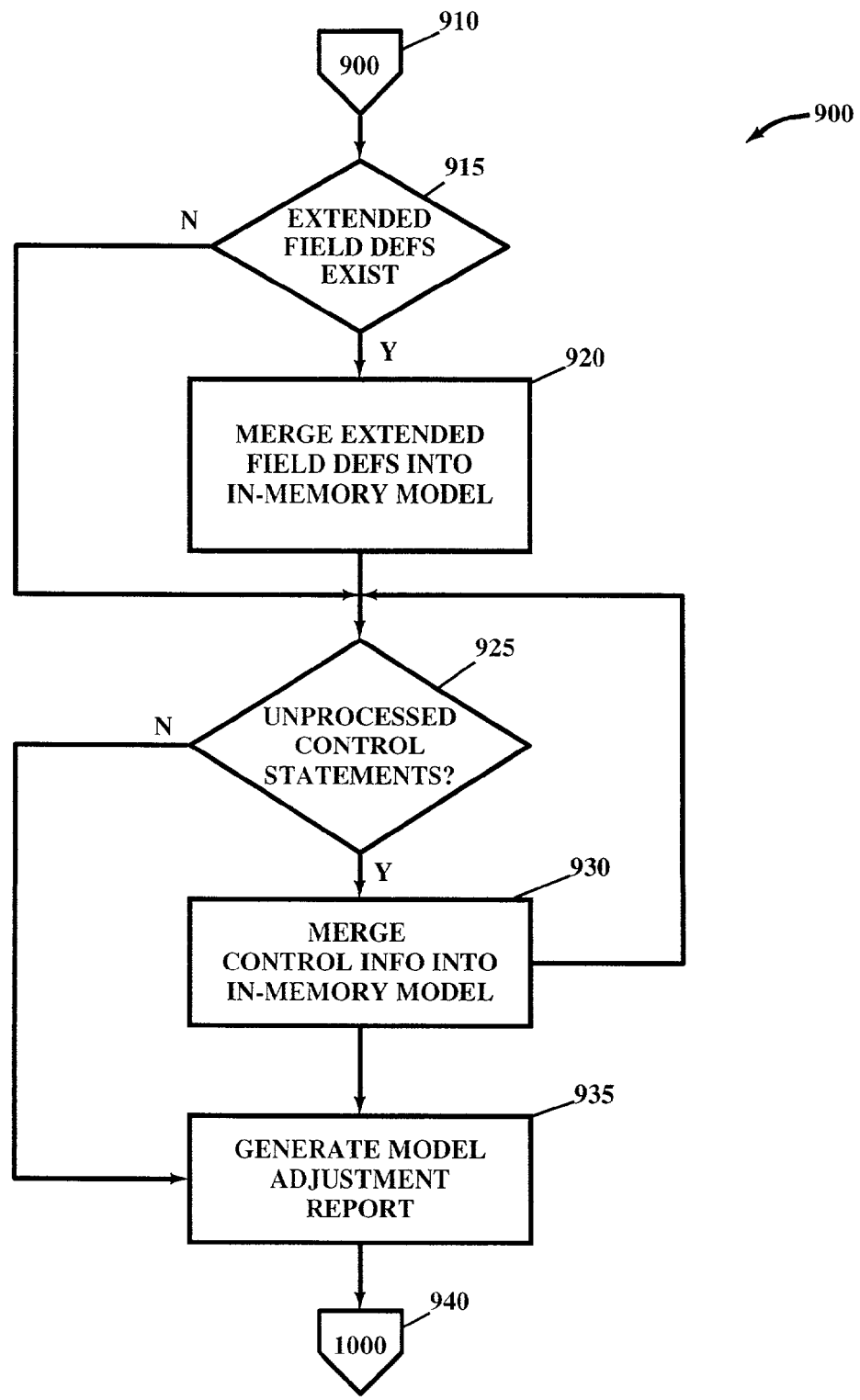
FIG. 9 is a flow diagram summarizing phase 2 processing of the class integrator utility program in accordance with one embodiment of the present invention.
Figure 10:
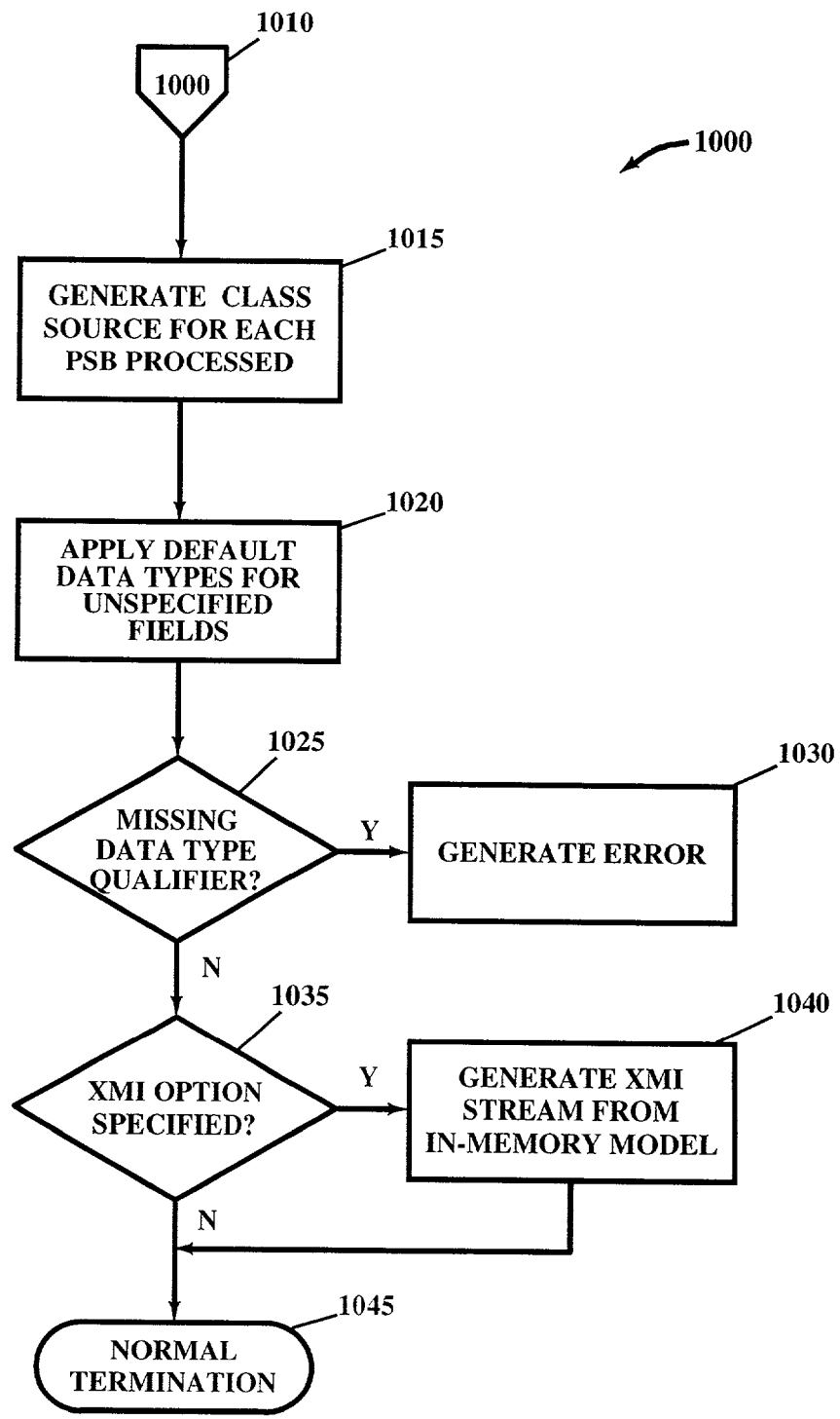
FIG. 10 is a flow diagram summarizing phase 3 processing of the class integrator utility program in accordance with one embodiment of the present invention.

Continuing with FIGS. 8–10, a preferred embodiment is described for the IMS hierarchical database and Java programming language. Referring now to FIG. 8, flow diagram 800 illustrates the high level flow of the first phase of processing performed by class integrator utility program 290 which builds an in-memory model of the hierarchical database legacy data structures. In step 810, class integrator utility program 290 reads PSB control statements from an MVS dataset, or from an HFS (Hierarchical File System) file. In one preferred embodiment, the first control statement is an option statement which specifies execution and input/output options (as shown in FIG. 6).

Next, in step 815, a PSB source file is read. The PSB is the IMS data structure that represents the logical view of the hierarchical database. The control statement specifies the name of the PSB to be read and processed, and may also optionally specify a Java name to be associated with this PSB. Continuing with step 820, the PSB source macro statements are parsed and selected information accumulated into the in-memory model representing the hierarchical database metadata.

In step 825, the source file of a referenced DBD is read and in step 830 the DBD source macro statements are parsed and selected information accumulated into the in-memory model representing the hierarchical database metadata. The in-memory model captures all information related to segments and fields and their hierarchical relationships. In step 835, a test is made to determine if additional DBDs are referenced by the PSB. If so, control passes back to step 825 where processing continues as discussed supra. Otherwise, in step 840, a test is made to determine if additional PSBs are associated with the PSB control statement currently being processed. This may occur where the PSB control statement incorporates a generic name, such as a "wild card" naming convention, wherein all PSBs matching the name form are to be processed. If one or more PSBs remain to be processed, control passes back to step 815 where processing continues as discussed supra.

Returning now to step 840, if there are no more PSBs to process for this PSB control statement, then processing continues with step 845, where a test is made to determine if additional PSB control statements exist. If so, control returns to step 810 and processing continues as discussed supra. Otherwise, in step 850 control passes to the beginning of flow diagram 900 of FIG. 9. Each PSB is reflected individually in the model, with its segments and fields; but if the PSBs share logical or physical databases, only a single instance of each database is added to the in-memory model and shared by the referencing PSBs.

Referring now to FIG. 9, flow diagram 900 illustrates phase 2 processing of class integrator utility program 290, where phase 2 operations carry out adjustments to the in-memory model that was built from phase 1 processing. Adjustments may be required because the information available from the database definitions and logical database views may not be sufficient to generate complete classes. Additional information may be required in several areas, including adding additional fields, creating Java-style aliases and establishing formatting information, such as Java data types.

First, step 910 receives control from step 850 of flow diagram 800, FIG. 8. Processing continues with step 915, where a test is made to determine if extended field definitions are present, such as COBOL copybooks. Those of ordinary skill in the art will recognize that this information may be provided in a transformed form produced by an importer, such as an XMI data stream conforming to the HLL language metamodel, or any other intermediary data form. If extended field definitions are present then, in step 920, this additional field information is merged into the in-memory model before proceeding to the test at step 925. An extended field definition is related to a particular DBD and physical segment through a Segment control statement. Fields found in the extended field definition that are not yet in the model are added to the segment with their field name, offset, length and data type. If, however, a field in the extended field definition coincides (same starting offset and length) with an existing field in the model, then a new field is not added to the model. Instead, the Java name and the data type in the existing model field are set to the name and data type of the field in the extended field definition. Those of ordinary skill in the art will recognize that many detailed design decisions are possible within the framework of the teachings contained herein. For example, in another embodiment, an error could be generated when extended field definitions coincide with existing fields within the in-memory model.

Returning now to step 915, if extended field definitions are not present, processing continues with step 925 where a test is made to determine the presence of additional model related control statements. If additional unprocessed control statements exist, the processing continues with step 930. Step 930 merges additional control statement information into the in-memory model.

A 'PSB' control statement type allows the user to specify an alias name for a PSB, which determines the name of the generated IMS Java class. A 'PCB' control statement type allows the user to specify an alias name for an existing PCB within a PSB. A 'SEGM' control statement type allows the user to specify an alias Java name for an existing logical or physical segment. A 'field' control statement type allows the user to specify a filed in a specified DBD and/or a physical segment, either by its starting offset and length, or by its 8-character IMS name. A new field object is created in the model if not already present. If the field is coincident with an existing field (same 8-character name, or same starting offset and length) then the information in the existing field is overridden by the control statement information. An 'XDFLD' statement allows an alias to be provided for an IMS secondary index field already specified within the DBD. A 'field' type control statement takes precedence over extended field definitions where conflicts occur.

Processing continues from step 930 to step 935, where a Model Adjustment Report is generated summarizing status information accumulated during the building of the in-memory model (the Model Adjustment Report is not shown). In step 940, control passes to the beginning of flow diagram 1000, FIG. 10.

Referring now to FIG. 10, flow diagram 1000 illustrates phase 3 processing of class integrator utility program 290, where the contents of the in-memory model are written to supported output files. First, step 1010 receives control from step 940 of flow diagram 900, FIG. 9. Processing continues with step 1015, where Java class source is generated by traversing the in-memory model for each PSB processed. Each class source is written to a supported output file (such as an HFS file) with the same name as the class, and a suffix of "Java". If no Java name has been provided, the 8 character IMS PSB name is used. The class integrator utility program 290 builds IMS-Java classes with correct hierarchies and segment field layouts, automatically handling any special situations, such as concatenated segments, noncontiguous key fields, secondary indexing, system related fields and the like. Where available from the model, alias names, data types and type qualifiers are included in the generated classes.

Processing continues with step 1020, where a default data type of "CHAR" is used for each unspecified data type. Next, in step 1025, a test is made to determine if a required type qualifier is missing for any data types. If so, in step 1030 an error condition is generated and class integrator utility 290 terminates processing. Otherwise, in step 1035, a test is made to determine if an optional XMI metadata stream has been requested by the user of class integrator utility 290 (an exemplary XMI metadata stream is shown in Appendix B). If so, in step 1040, an XMI metadata stream is generated to facilitate an interchange of metadata whereby the XMI stream is utilized by other applications and tools to regenerate class information into a required form appropriate for their usage. In step 1045, class integrator utility 290 completes normal processing and terminates.

Taken in combination flow diagram 800, 900 and 1000 in conjunction with supporting diagrams and detailed descriptions provide for enhanced reliability and programmer productivity by automatically generating classes with an integrated customization and interchange capability. Although flow diagrams 800–1000 use IMS and Java as exemplary platforms, those of ordinary skill in the art will appreciate that the teachings contained herein apply to any hierarchical database and any object oriented language environment. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modifications and adaptations to the embodiment(s) shown may occur to one of ordinary skill in the art without departing from the scope of the present invention as set forth in the following claims. Thus, the scope of this invention is to be construed according to the appended claims and not limited by the specific details disclosed in the exemplary embodiments.

APPENDIX A

Generated Java Class

```
package com.ibm.ims.tooling;
import com.ibm.ims.db.*;
import com.ibm.ims.base.*;
public class DealerDatabaseView extends DLIDatabaseView {
// This class dscribes the data view of PSB: DLR_PSB
// PSB DLR_PSB has database PCBs with 8-char PCBNAME or label:
//       DLR_PCB1
// The following DLITypeInfo[ ] array describes Segment: DEALER in PCB: DLR_PCB1
     static DLITypeInfo[ ] DLR_PCB1DEALERArray= {
         new DLITypeInfo("DealerNumber", DLITypeInfo.CHAR, 1, 4, "DLRNO"),
         new DLITypeInfo("DLRNAME", DLITypeInfo.CHAR, 5, 30, "DLRNAME"),
         new DLITypeInfo("DealerName",DLITypeInfo.CHAR,5, 30),
         new DLITypeInfo("YTDSales","S9(18)", DLITypeInfo.PACKEDDECIMAL,85, 10)
         };
     static DLISegment DLR_PCB1DEALERSegment= new DLISegment
         ("DealerSeg","DEALER",DLR_PCB1DEALERArray,94);
// The following DLITypeInfo[ ] array describes Segment: MODEL in PCB: DLR_PCB1
     static DLITypeInfo[ ] DLR_PCB1MODELArray= {
         new DLITypeInfo("ModelTypeCode", DLITypeInfo.CHAR, 1, 2, "MODTYPE"),
         new DLITypeInfo("CarMake", DLITypeInfo.CHAR, 3, 10, "MAKE"),
         new DLITypeInfo("EPAHighwayMilage",DLITypeInfo.CHAR,36, 4),
         new DLITypeInfo("Horsepower",DLITypeInfo.CHAR,40, 4)
         };
     static DLISegment DLR_PCB1MODELSegment= new DLISegment
         ("ModelSeg","MODEL",DLR_PCB1MODELArray,43);
// The following DLITypeInfo[ ] array describes Segment: ORDER in PCB: DLR_PCB1
     static DLITypeInfo[ ] DLR_PCB1ORDERArray= {
         new DLITypeInfo("OrderNumber", DLITypeInfo.CHAR, 1, 6, "ORDNBR"),
         new DLITypeInfo("PurchaserLastName", DLITypeInfo.CHAR, 50, 25, "LASTNME"),
         new DLITypeInfo("Price","99999", DLITypeInfo.ZONEDDECIMAL,37, 5),
         new DLITypeInfo("OrderDate",DLITypeInfo.CHAR,42, 8),
         new DLITypeInfo("DeliverDate",DLITypeInfo.CHAR, 120, 8)
```

APPENDIX A-continued

Generated Java Class

```
        };
    static DLISegment DLR_PCB1ORDERSegment= new DLISegment
        ("OrderSeg","ORDER",DLR_PCB1ORDERArray,127);
// The following DLITypeInfo[ ] array describes Segment: SALES in PCB: DLR_PCB1
    static DLITypeInfo[ ] DLR_PCB1SALESArray= {
        new DLITypeInfo("DateSold", DLITypeInfo.CHAR, 1, 8, "SALDATE"),
        new DLITypeInfo("PurchaserLastName", DLITypeInfo.CHAR, 9, 25, "LASTNME"),
        new DLITypeInfo("PurchasetFirstName", DLITypeInfo.CHAR, 34, 25, "FIRSTNME"),
        new DLITypeInfo("SoldBy",DLITypeInfo.CHAR,84, 10)
        };
    static DLISegment DLR_PCB1SALESSegment= new DLISegment
        ("SalesSeg","SALES ",DLR_PCB1SALESArray,113);
// The following DLITypeInfo[ ] array describes Segment: STOCK in PCB: DLR_PCB1
    static DLITypeInfo[ ] DLR_PCB1STOCKArray= {
        new DLITypeInfo("Stock VINumber", DLITypeInfo.CHAR, 1, 20, "STKVIN"),
        new DLITypeInfo("Price","99999", DLITypeInfo.ZONEDDECIMAL,47, 5, "PRICE"),
        new DLITypeInfo("DateIn",DLITypeInfo.CHAR,21, 8)
        };
    static DLISegment DLR_PCB1STOCKSegment= new DLISegment
        ("StockSeg","STOCK",DLR_PCB1STOCKArray,62);
// An array of DLISegmentInfo objects follows to describe the view for PCB: DLR_PCB1
static DLISegmentInfo[ ] DLR_PCB1array = {
        new DLISegmentInfo(DLR_PCB1DEALERSegment,DLIDatabaseView.ROOT),
        new DLISegmentInfo(DLR_PCB1MODELSegment,0),
        new DLISegmentInfo(DLR_PCB1ORDERSegment,1),
        new DLISegmentInfo(DLR_PCB1SALESSegment,1),
        new DLISegmentInfo(DLR_PCB1STOCKSegment,1)
        };
// Constructor
public DealerDatabaseView( ) {
    super("DLR_PSB", "DealershipDB", "DLR_PCB1", DLR_PCB1array);
    }// end DealerDatabaseView constructor
}// end DealerDatabaseView class definition
```

APPENDIX B

Generated XMI Metadata Stream

```
<?xml version="1.0" encoding="UTF-8"?>
<xmi:XMI xmi:version="2.0" xmlns:xmi="http://www.omg.org/XMI"
xmlns:cwmmodel="cwmmodel.xmi" xmlns:xsi="http://www.w3.org/2001/XMLSchema-
instance">
    <cwmmodel:PSB xmi:id="PSB_1" PSBNAME="DLR_PSB" MAXQ="200"
JavaName="DealerDatabaseView" dbPCB="DbPCB_1">
        <LANG xsi:nil="true"/>
        <CMPAT xsi:nil="true"/>
        <IOASIZE xsi:nil="true"/>
        <SSASIZE xsi:nil="true"/>
        <IOEROPNn xsi:nil="true"/>
        <IOEROPNw xsi:nil="true"/>
        <OLIC xsi:nil="true"/>
        <GSROLBOK xsi:nil="true"/>
        <LOKMAX xsi:nil="true"/>
    </cwmmodel:PSB>
    <cwmmodel:DbPCB xmi:id="DbPCB_1" PCBNAME="DLR_PCB1" TYPE="DB"
PROCOPT="GO" KEYLEN="42" JavaName="DealershipDB" dbd="DbdHDAM_1"
psb="PSB_1" senseg="Senseg_1 Senseg_2 Senseg_3 Senseg_4 Senseg_5">
        <SB xsi:nil="true"/>
        <POS xsi:nil="true"/>
        <VIEW xsi:nil="true"/>
        <LIST xsi:nil="true"/>
    </cwmmodel:DbPCB>
    <cwmmodel:DbdHDAM xmi:id="DbdHDAM_1" NAME="DEALERDB"
ACCESS1="HDAM" ACCESS2="OSAM" PASSWD="false" DATXEXIT="false"
RMMODname="DFSHDC40.1.10" RMMODanch="0" RMMODrbn="0" RMMODbytes="0"
dbPCB="DbPCB_1" segmentHDAM="SegmentHDAM_1 SegmentHDAM_2
SegmentHDAM_3 SegmentHDAM_4 SegmentHDAM_5">
        <VERSION xsi:nil="true"/>
    </cwmmodel:DbdHDAM>
    <cwmmodel:SegmentHDAM xmi:id="SegmentHDAM_1" NAME="DEALER"
JavaName="DealerSeg" BYTESMax="94" senseg="Senseg_1" child="SegmentHDAM_2"
field="Field_1 Field_2 Field_3 Field_4" dbdHDAM="DbdHDAM_1">
        <BYTESMin xsi:nil="true"/>
        <FREQ xsi:nil="true"/>
```

APPENDIX B-continued

Generated XMI Metadata Stream

```
            <RULESI xsi:nil="true"/>
            <RULESD xsi:nil="true"/>
            <RULESR xsi:nil="true"/>
            <RULESPTInsert xsi:nil="true"/>
            <RULESLTInsert xsi:nil="true"/>
            <COMPRTNName xsi:nil="true"/>
            <COMPRTNKeyOpt xsi:nil="true"/>
            <COMPRTNIINIT xsi:nil="true"/>
            <COMPRTNMAX xsi:nil="true"/>
            <PtrT xsi:nil="true"/>
            <PtrTB xsi:nil="true"/>
            <PtrH xsi:nil="true"/>
            <PtrHB xsi:nil="true"/>
            <PtrNT xsi:nil="true"/>
            <PtrLT xsi:nil="true"/>
            <PtrLTB xsi:nil="true"/>
            <PtrLP xsi:nil="true"/>
            <PtrPAIRED xsi:nil="true"/>
            <PtrCtr xsi:nil="true"/>
            <PtrPCSngl xsi:nil="true"/>
            <PtrPCDble xsi:nil="true"/>
            <PtrLCNone xsi:nil="true"/>
            <PtrLCSngl xsi:nil="true"/>
            <PtrLCDble xsi:nil="true"/>
            <PtrLCSymb xsi:nil="true"/>
            <LPKOpt xsi:nil="true"/>
        </cwmmodel:SegmentHDAM>
        <cwmmodel:Field xmi:id="Field_1" NAME="DLRNO" SEQInd="true" UniqueInd="true"
BYTES="4" STARTPOS="1" TYPE="C" fromDBD="true" JavaName="DealerNumber"
JavaType="CHAR" segmentPhysical="SegmentHDAM_1">
            <JavaTypeQualifier xsi:nil="true"/>
        </cwmmodel:Field>
        <cwmmodel:Field xmi:id="Field_2" NAME="DLRNAME" BYTES="30" STARTPOS="5"
TYPE="C" fromDBD="true" segmentPhysical="SegmentHDAM_1">
            <SEQInd xsi:nil="true"/>
            <UniqueInd xsi:nil="true"/>
            <JavaName xsi:nil="true"/>
            <JavaType xsi:nil="true"/>
            <JavaTypeQualifier xsi:nil="true"/>
        </cwmmodel:Field>
        <cwmmodel:SegmentHDAM xmi:id="SegmentHDAM_2" NAME="MODEL"
JavaName="ModelSeg" BYTESMax="43" senseg="Senseg_2" child="SegmentHDAM_3
SegmentHDAM_4 SegmentHDAM_5" parent="SegmentHDAM_1" field="Field_5 Field_6
Field_7 Field_8" dbdHDAM="DbdHDAM_1">
            <BYTESMin xsi:nil="true"/>
            <FREQ xsi:nil="true"/>
            <RULESI xsi:nil="true"/>
            <RULESD xsi:nil="true"/>
            <RULESR xsi:nil="true"/>
            <RULESPTInsert xsi:nil="true"/>
            <RULESLTInsert xsi:nil="true"/>
            <COMPRTNName xsi:nil="true"/>
            <COMPRTNKeyOpt xsi:nil="true "/>
            <COMPRTNINIT xsi:nil="true"/>
            <COMPRTNMAX xsi:nil="true"/>
            <PtrT xsi:nil="true"/>
            <PtrTB xsi:nil="true"/>
            <PtrH xsi:nil="true"/>
            <PtrHB xsi:nil="true"/>
            <PtrNT xsi:nil="true"/>
            <PtrLT xsi:nil="true"/>
            <PtrLTB xsi:nil="true"/>
            <PtrLP xsi:nil="true"/>
            <PtrPAIRED xsi:nil="true"/>
            <PtrCtr xsi:nil="true"/>
            <PtrPCSngl xsi:nil="true"/>
            <PtrPCDble xsi:nil="true"/>
            <PtrLCNone xsi:nil="true"/>
            <PtrLCSngl xsi:nil="true"/>
            <PtrLCDble xsi:nil="true"/>
            <PtrLCSymb xsi:nil="true"/>
            <LPKOpt xsi:nil="true"/>
        </cwmmodel:SegmentHDAM>
        <cwmmodel:Field xmi:id="Field_5" NAME="MODTYPE" SEQInd="true" UniqueInd="true"
BYTES="2" STARTPOS="1" TYPE="C" fromDBD="true" JavaName="ModelTypeCode"
JavaType="CHAR" segmentPhysical="SegmentHDAM_2">
            <JavaTypeQualifier xsi:nil="true"/>
```

APPENDIX B-continued

Generated XMI Metadata Stream

```xml
        </cwmmodel:Field>
        <cwmmodel:Field xmi:id="Field_6" NAME="MAKE" BYTES="10" STARTPOS="3"
TYPE="C" fromDBD="true" JavaName="CarMake" JavaType="CHAR"
segmentPhysical="SegmentHDAM_2">
                <SEQInd xsi:nil="true"/>
                <UniqueInd xsi:nil="true"/>
                <JavaTypeQualifier xsi:nil="true"/>
        </cwmmodel:Field>
        <cwmmodel:SegmentHDAM xmi:id="SegmentHDAM_3" NAME="ORDER"
JavaName="OrderSeg" BYTESMax="127" senseg="Senseg_3" parent="SegmentHDAM_2"
field="Field_9 Field_10 Field_11 Field_12 Field_13" dbdHDAM="DbdHDAM_1">
                <BYTESMin xsi:nil="true"/>
                <FREQ xsi:nil="true"/>
                <RULESI xsi:nil="true"/>
                <RULESD xsi:nil="true"/>
                <RULESR xsi:nil="true"/>
                <RULESPTInsert xsi:nil="true"/>
                <RULESLTInsert xsi:nil="true"/>
                <COMPRTNName xsi:nil="true"/>
                <COMPRTNKeyOpt xsi:nil="true"/>
                <COMPRTNINIT xsi:nil="true"/>
                <COMPRTNMAX xsi:nil="true"/>
                <PtrT xsi:nil="true"/>
                <PtrTB xsi:nil="true"/>
                <PtrH xsi:nil="true"/>
                <PtrHB xsi:nil="true"/>
                <PtrNT xsi:nil="true"/>
                <PtrLT xsi:nil="true"/>
                <PtrLTB xsi:nil="true"/>
                <PtrLP xsi:nil="true"/>
                <PtrPAIRED xsi:nil="true"/>
                <PtrCtr xsi:nil="true"/>
                <PtrPCSngl xsi:nil="true"/>
                <PtrPCDble xsi:nil="true"/>
                <PtrLCNone xsi:nil="true"/>
                <PtrLCSngl xsi:nil="true"/>
                <PtrLCDble xsi:nil="true"/>
                <PtrLCSymb xsi:nil="true"/>
                <LPKOpt xsi:nil="true"/>
        </cwmmodel:SegmentHDAM>
        <cwmmodel:Field xmi:id="Field_9" NAME="ORDNBR" SEQInd="true" UniqueInd="true"
BYTES="6" STARTPOS="1" TYPE="C" fromDBD="true" JavaName="OrderNumber"
JavaType="CHAR" segmentPhysical="SegmentHDAM_3">
                <JavaTypeQualifier xsi:nil="true"/>
        </cwmmodel:Field>
        <cwmmodel:Field xmi:id="Field_10" NAME="LASTNME" BYTES="25" STARTPOS="50"
TYPE="C" fromDBD="true" JavaName="PurchaserLastName" JavaType="CHAR"
segmentPhysical="SegmentHDAM_3">
                <SEQInd xsi:nil="true"/>
                <UniqueInd xsi:nil="true"/>
                <JavaTypeQualifier xsi:nil="true"/>
        </cwmmodel:Field>
        <cwmmodel:SegmentHDAM xmi:id="SegmentHDAM_4" NAME="SALES"
JavaName="SalesSeg" BYTESMax="113" senseg="Senseg_4" parent="SegmentHDAM_2"
field="Field_14 Field_15 Field_16 Field_17" dbdHDAM="DbdHDAM_1">
                <BYTESMin xsi:nil="true"/>
                <FREQ xsi:nil="true"/>
                <RULESI xsi:nil="true"/>
                <RULESD xsi:nil="true"/>
                <RULESR xsi:nil="true"/>
                <RULESPTInsert xsi:nil="true"/>
                <RULESLTInsert xsi:nil="true"/>
                <COMPRTNName xsi:nil="true"/>
                <COMPRTNKeyOpt xsi:nil="true"/>
                <COMPRTNINIT xsi:nil="true"/>
                <COMPRTNMAX xsi:nil="true"/>
                <PtrT xsi:nil="true"/>
                <PtrTB xsi:nil="true"/>
                <PtrH xsi:nil="true"/>
                <PtrHB xsi:nil="true"/>
                <PtrNT xsi:nil="true"/>
                <PtrLT xsi:nil="true"/>
                <PtrLTB xsi:nil="true"/>
                <PtrLP xsi:nil="true"/>
                <PtrPAIRED xsi:nil="true"/>
                <PtrCtr xsi:nil="true"/>
                <PtrPCSngl xsi:nil="true"/>
```

APPENDIX B-continued

Generated XMI Metadata Stream

```
            <PtrPCDble xsi:nil="true"/>
            <PtrLCNone xsi:nil="true"/>
            <PtrLCSngl xsi:nil="true"/>
            <PtrLCDble xsi:nil="true"/>
            <PtrLCSymb xsi:nil="true"/>
            <LPKOpt xsi:nil="true"/>
        </cwmmodel:SegmentHDAM>
        <cwmmodel:Field xmi:id="Field_14" NAME="SALDATE" SEQInd="true"
UniqueInd="true" BYTES="8" STARTPOS="1" TYPE="C" fromDBD="true"
JavaName="DateSold" JavaType="CHAR" segmentPhysical="SegmentHDAM_4">
            <JavaTypeQualifier xsi:nil="true"/>
        </cwmmodel:Field>
        <cwmmodel:Field xmi:id="Field_15" NAME="LASTNME" BYTES="25" STARTPOS="9"
TYPE="C" fromDBD="true" JavaName="PurchaserLastName" JavaType="CHAR"
segmentPhysical="SegmentHDAM_4">
            <SEQInd xsi:nil="true"/>
            <UniqueInd xsi:nil="true"/>
            <JavaTypeQualifier xsi:nil="true"/>
        </cwmmodel:Field>
        <cwmmodel:Field xmi:id="Field_16" NAME="FRSTNME" BYTES="25"
STARTPOS="34" TYPE="C" fromDBD="true" JavaName="PurchasetFirstName"
JavaType="CHAR" segmentPhysical="SegmentHDAM_4">
            <SEQInd xsi:nil="true"/>
            <UniqueInd xsi:nil="true"/>
            <JavaTypeQualifier xsi:nil="true"/>
        </cwmmodel:Field>
        <cwmmodel:SegmentHDAM xmi:id="SegmentHDAM_5" NAME="STOCK"
JavaName="StockSeg" BYTESMax="62" senseg="Senseg_5" parent="SegmentHDAM_2"
field="Field_18 Field_19 Field_20" dbdHDAM="DbdHDAM_1">
            <BYTESMin xsi:nil="true"/>
            <FREQ xsi:nil="true"/>
            <RULESI xsi:nil="true"/>
            <RULESD xsi:nil="true"/>
            <RULESR xsi:nil="true"/>
            <RULESPTInsert xsi:nil="true"/>
            <RULESLTInsert xsi:nil="true"/>
            <COMPRTNName xsi:nil="true"/>
            <COMPRTNKeyOpt xsi:nil="true"/>
            <COMPRTNINIT xsi:nil="true"/>
            <COMPRTNMAX xsi:nil="true"/>
            <PtrT xsi:nil="true"/>
            <PtrTB xsi:nil="true"/>
            <PtrH xsi:nil="true"/>
            <PtrHB xsi:nil="true"/>
            <PtrNT xsi:nil="true"/>
            <PtrLT xsi:nil="true"/>
            <PtrLTB xsi:nil="true"/>
            <PtrLP xsi:nil="true"/>
            <PtrPAIRED xsi:nil="true"/>
            <PtrCtr xsi:nil="true"/>
            <PtrPCSngl xsi:nil="true"/>
            <PtrPCDble xsi:nil="true"/>
            <PtrLCNone xsi:nil="true"/>
            <PtrLCSngl xsi:nil="true"/>
            <PtrLCDble xsi:nil="true"/>
            <PtrLCSymb xsi:nil="true"/>
            <LPKOpt xsi:nil="true"/>
        </cwmmodel:SegmentHDAM>
        <cwmmodel:Field xmi:id="Field_18" NAME="STKVIN" SEQInd="true" UniqueInd="true"
BYTES="20" STARTPOS="1" TYPE="C" fromDBD="true" JavaName="StockVINumber"
JavaType="CHAR" segmentPhysical="SegmentHDAM_5">
            <JavaTypeQualifier xsi:nil="true"/>
        </cwmmodel:Field>
        <cwmmodel:Field xmi:id="Field_19" NAME="PRICE" BYTES="5" STARTPOS="47"
TYPE="C" fromDBD="true" JavaName="Price" JavaType="ZONEDDECIMAL"
JavaTypeQualifier="99999" segmentPhysical="SegmentHDAM_5">
            <SEQInd xsi:nil="true"/>
            <UniqueInd xsi:nil="true"/>
        </cwmmodel:Field>
        <cwmmodel:Senseg xmi:id="Senseg_1" dbPCB="DbPCB_1" segment="SegmentHDAM_1"
child="Senseg_2">
            <PROCOPT xsi:nil="true"/>
            <SSPTR xsi:nil="true"/>
        </cwmmodel:Senseg>
        <cwmmodel:Senseg xmi:id="Senseg_2" dbPCB="DbPCB_1" segment="SegmentHDAM_2"
parent="Senseg_1" child="Senseg_3 Senseg_4 Senseg_5">
            <PROCOPT xsi:nil="true"/>
```

APPENDIX B-continued

Generated XMI Metadata Stream

```
        <SSPTR xsi:nil="true"/>
    </cwmmodel:Senseg>
    <cwmmodel:Senseg xmi:id="Senseg_3" dbPCB="DbPCB_1" segment="SegmentHDAM_3"
parent="Senseg_2">
        <PROCOPT xsi:nil="true"/>
        <SSPTR xsi:nil="true"/>
    </cwmmodel:Senseg>
    <cwmmodel:Senseg xmi:id="Senseg_4" dbPCB="DbPCB_1" segment="SegmentHDAM_4"
parent="Senseg_2">
        <PROCOPT xsi:nil="true"/>
        <SSPTR xsi:nil="true"/>
    </cwmmodel:Senseg>
    <cwmmodel:Senseg xmi:id="Senseg_5" dbPCB="DbPCB_1" segment="SegmentHDAM_5"
parent="Senseg_2">
        <PROCOPT xsi:nil="true"/>
        <SSPTR xsi:nil="true"/>
    </cwmmodel:Senseg>
    <cwmmodel:Field xmi:id="Field_3" SEQInd="false" UniqueInd="false" BYTES="30"
STARTPOS="5" TYPE="C" fromDBD="false" JavaName="DealerName" JavaType="CHAR"
segmentPhysical="SegmentHDAM_1">
        <NAME xsi:nil="true"/>
        <JavaTypeQualifier xsi:nil="true"/>
    </cwmmodel:Field>
    <cwmmodel:Field xmi:id="Field_4" SEQInd="false" UniqueInd="false" BYTES="10"
STARTPOS="85" TYPE="P" fromDBD="false" JavaName="YTDSales"
JavaType="PACKEDDECIMAL" JavaTypeQualifier="S9(18)"
segmentPhysical="SegmentHDAM_1">
        <NAME xsi:nil="true"/>
    </cwmmodel:Field>
    <cwmmodel:Field xmi:id="Field_7" SEQInd="false" UniqueInd="false" BYTES="4"
STARTPOS="36" TYPE="C" fromDBD="false" JavaName="EPAHighwayMilage"
JavaType="CHAR" segmentPhysical="SegmentHDAM_2">
        <NAME xsi:nil="true"/>
        <JavaTypeQualifier xsi:nil="true"/>
    </cwmmodel:Field>
    <cwmmodel:Field xmi:id="Field_8" SEQInd="false" UniqueInd="false" BYTES="4"
STARTPOS="40" TYPE="C" fromDBD="false" JavaName="Horsepower"
JavaType="CHAR" segmentPhysical="SegmentHDAM_2">
        <NAME xsi:nil="true"/>
        <JavaTypeQualifier xsi:nil="true"/>
    </cwmmodel:Field>
    <cwmmodel:Field xmi:id="Field_11" SEQInd="false" UniqueInd="false" BYTES="5"
STARTPOS="37" TYPE="C" fromDBD="false" JavaName="Price"
JavaType="ZONEDDECIMAL" JavaTypeQualifier="99999"
segmentPhysical="SegmentHDAM_3">
        <NAME xsi:nil="true"/>
    </cwmmodel:Field>
    <cwmmodel:Field xmi:id="Field_12" SEQInd="false" UniqueInd="false" BYTES="8"
STARTPOS="42" TYPE="C" fromDBD="false" JavaName="OrderDate" JavaType="CHAR"
segmentPhysical="SegmentHDAM_3">
        <NAME xsi:nil="true"/>
        <JavaTypeQualifier xsi:nil="true"/>
    </cwmmodel:Field>
    <cwmmodel:Field xmi:id="Field_13" SEQInd="false" UniqueInd="false" BYTES="8"
STARTPOS="120" TYPE="C" fromDBD="false" JavaName="DeliverDate"
JavaType="CHAR" segmentPhysical="SegmentHDAM_3">
        <NAME xsi:nil="true"/>
        <JavaTypeQualifier xsi:nil="true"/>
    </cwmmodel:Field>
    <cwmmodel:Field xmi:id="Field_17" SEQInd="false" UniqueInd="false" BYTES="10"
STARTPOS="84" TYPE="C" fromDBD="false" JavaName="SoldBy" JavaType="CHAR"
segmentPhysical="SegmentHDAM_4">
        <NAME xsi:nil="true"/>
        <JavaTypeQualifier xsi:nil="true"/>
    </cwmmodel:Field>
    <cwmmodel:Field xmi:id="Field_20" SEQInd="false" UniqueInd="false" BYTES="8"
STARTPOS="21" TYPE="C" fromDBD="false" JavaName="DateIn" JavaType="CHAR"
segmentPhysical="SegmentHDAM_5">
        <NAME xsi:nil="true"/>
        <JavaTypeQualifier xsi:nil="true"/>
    </cwmmodel:Field>
</xmi:XMI>
```

What is claimed:

1. A computer implemented method for automatically generating and customizing a class to facilitate access to an Information Management System (IMS) database from an application comprising:
   (a) accessing a database definition, comprising a DataBase Definition (DBD) for an IMS database;
   (b) accessing a logical database view, comprising a Program Specification Block (PSB) for the IMS database;
   (c) accessing an extended field definition;
   (d) accessing control statement information;
   (e) building an in-memory representation of selective information obtained from steps (a) through (d);
   (f) automatically generating and customizing a class in a first form utilizing said in-memory representation wherein the class is configured to access the IMS database responsive to a hierarchical database access request from a first application, the class encapsulating hierarchical database metadata required to access the associated IMS database; and
   (g) automatically generating a stream of metadata compatible with an eXtensible Markup Language Metadata Interchange (XMI) format, wherein the stream of metadata is configured for use in regeneration of the class in a second form compatible with a second application accessing the associated IMS database.

2. The method of claim 1 wherein said class, said database definition, said logical database view and said extended field definition comprise one or more classes, database definitions, logical database views and extended field definitions, respectively.

3. The method of claim 1 wherein said first application is an application written in the Java programming language.

4. The method of claim 1 wherein said customizing comprises establishing an alias name for a Program Communication Block (PCB) name.

5. The method of claim 1 wherein said customizing comprises establishing an alias name for a segment.

6. The method of claim 1 wherein said customizing comprises establishing an alias name for a field within a segment.

7. The method of claim 1 wherein said extended field definition comprises a COBOL copy book.

8. The method of claim 7 wherein said COBOL copy book is in the form of an eXtensible Markup Language Metadata Interchange (XMI) metadata stream.

9. A computer system for automatically generating and customizing a class to facilitate access to an Information Management System (IMS) database from an application, said computer system comprising:
   (a) a computer;
   (b) means for accessing a database definition, comprising a DataBase Definition (DBD) for an IMS database;
   (c) means for accessing a logical database view, comprising a Program Specification Block (PSB) for the IMS database;
   (d) means for accessing an extended field definition;
   (e) means for accessing control statement information;
   (f) means for building an in-memory representation of selective information utilizing (b) through (e); and
   (g) means for automatically generating and customizing a class in a first form utilizing said in-memory representation wherein the class is configured to access the IMS database responsive to a hierarchical database access request from a first application, the class encapsulating hierarchical database metadata required to access the associated IMS database; and
   (h) automatically generating a stream of metadata compatible with an eXtensible Markup Language Metadata Interchange (XMI) format, wherein the stream of metadata is configured for use in regeneration of the class in a second form compatible with a second application accessing the associated EMS database.

10. The computer system of claim 9 wherein said class, said database definition, said logical database view and said extended field definition comprise one or more classes, database definitions, logical database views and extended field definitions, respectively.

11. The computer system of claim 9 wherein said first application is an application written in the Java programming language.

12. The computer system of claim 9 wherein said customizing comprises establishing an alias name for a Program Communication Block (PCB) name.

13. The computer system of claim 9 wherein said customizing comprises establishing an alias name for a segment.

14. The computer system of claim 9 wherein said customizing comprises establishing an alias name for a field within a segment.

15. The computer system of claim 9 wherein said extended field definition comprises a COBOL copy book.

16. The computer system of claim 15 wherein said COBOL copy book is in the form of an eXtensible Markup Language Metadata Interchange (XMI) metadata stream.

17. An article of manufacture for use in a computer system tangibly embodying computer instructions executable by said computer system to perform process steps for automatically generating and customizing a class to facilitate access to an Information Management System (IMS) database from an application comprising:
   (a) accessing a database definition, comprising a DataBase Definition (DBD) for an IMS database;
   (b) accessing a logical database view, comprising a Program Specification Block (PSB) for the IMS database;
   (c) accessing an extended field definition;
   (d) accessing control statement information;
   (e) building an in-memory representation of selective information obtained from steps (a) through (d);
   (f) automatically generating and customizing a class in a first form utilizing said in-memory representation wherein the class is configured to access the IMS database responsive to a hierarchical database access request from a first application, the class encapsulating hierarchical database metadata required to access the associated IMS database; and
   (g) automatically generating a stream of metadata compatible with an eXtensible Markup Language Metadata Interchange (XMI) format, wherein the stream of metadata is configured for use in regeneration of the class in a second form compatible with a second application accessing the associated IMS database.

18. The article of manufacture claim 17 wherein said class, said database definition, said logical database view and said extended field definition comprise one or more classes, database definitions, logical database views and extended field definitions, respectively.

19. The article of manufacture of claim 17 wherein said first application is an application written in the Java programming language.

20. The article of manufacture of claim 17 wherein said customizing comprises establishing an alias name for a Program Communication Block (PCB) name.

21. The article of manufacture of claim 17 wherein said customizing comprises establishing an alias name for a segment.

22. The article of manufacture of claim 17 wherein said customizing comprises establishing an alias name for a field within a segment.

23. The article of manufacture of claim 17 wherein said extended field definition comprises a COBOL copy book.

24. The article of manufacture of claim 23 wherein said COBOL copy book is in the form of an eXtensible Markup Language Metadata Interchange (XMI) metadata stream.

* * * * *